United States Patent
Kuroda

(10) Patent No.: US 8,864,155 B2
(45) Date of Patent: Oct. 21, 2014

(54) STABILIZER LINK AND METHOD FOR MANUFACTURING SAME

(75) Inventor: Shigeru Kuroda, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/885,339

(22) PCT Filed: Sep. 13, 2011

(86) PCT No.: PCT/JP2011/070831
§ 371 (c)(1),
(2), (4) Date: May 14, 2013

(87) PCT Pub. No.: WO2012/066844
PCT Pub. Date: May 24, 2012

(65) Prior Publication Data
US 2013/0234412 A1    Sep. 12, 2013

(30) Foreign Application Priority Data

Nov. 19, 2010  (JP) ................................ 2010-258825

(51) Int. Cl.
| | |
|---|---|
| *B60G 21/055* | (2006.01) |
| *F16C 11/06* | (2006.01) |
| *B29C 45/14* | (2006.01) |
| *B60G 7/00* | (2006.01) |
| B29C 33/10 | (2006.01) |
| B29K 105/06 | (2006.01) |
| B29K 105/12 | (2006.01) |
| B29L 31/30 | (2006.01) |

(52) U.S. Cl.
CPC ........... *B60G 21/055* (2013.01); *F16C 2220/04* (2013.01); *B60G 2204/1224* (2013.01);

(Continued)

(58) Field of Classification Search
USPC .................. 280/124.107; 403/122, 132, 133; 29/441.1, 527.1, 898.05
See application file for complete search history.

(56) References Cited

U.S. PATENT DOCUMENTS

| | | | |
|---|---|---|---|
| 3,969,030 A | * | 7/1976 | Sullivan ....................... 403/132 |
| 5,427,467 A | | 6/1995 | Sugiura |

(Continued)

FOREIGN PATENT DOCUMENTS

| | | |
|---|---|---|
| EP | 0 832 769 A2 | 4/1998 |
| JP | A-6-117429 | 4/1994 |

(Continued)

OTHER PUBLICATIONS

Dec. 20, 2011 International Search Report issued in International Application No. PCT/JP2011/070831 (with translation).

(Continued)

*Primary Examiner* — Paul N Dickson
*Assistant Examiner* — Darlene P Condra
(74) *Attorney, Agent, or Firm* — Oliff PLC

(57) ABSTRACT

Injection molding is performed such that the reinforced resin is injected into the cavity and the space. The fixing portion shown is formed at the bottom portion side of the side surface portion of the main body portion by the injection molding. In this case, the fixing protrusion stripe portion, which is fitted to the fixing groove portion of the main body portion, is formed at the fixing portion. The projection portion projecting from the hole portion of the housing to an external portion is formed at the bottom portion of the fixing portion, and the projection portion is formed to have the shape engaging with the outer surface of the bottom portion of the housing.

6 Claims, 8 Drawing Sheets

(52) U.S. Cl.
CPC ............. B29C 33/10 (2013.01); *B29K 2105/06* (2013.01); *B60G 2204/416* (2013.01); F16C 11/0638 (2013.01); B29C 45/14467 (2013.01); *B60G 2206/11* (2013.01); *B60G 2206/7101* (2013.01); *B60G 2206/81012* (2013.01); B60G 7/005 (2013.01); *B29K 2105/12* (2013.01); *B29L 2031/30* (2013.01)
USPC .................. 280/124.107; 29/441.1; 29/527.1; 403/122; 403/133

(56) References Cited

U.S. PATENT DOCUMENTS

| | | | | |
|---|---|---|---|---|
| 5,697,142 | A * | 12/1997 | Sugiura | ........................ 29/527.4 |
| 6,139,788 | A | 10/2000 | Dorr | |
| 6,398,446 | B1 * | 6/2002 | Pazdirek et al. | ............. 403/134 |
| 6,604,270 | B2 * | 8/2003 | Kincaid et al. | ............... 29/441.1 |
| 7,134,801 | B2 * | 11/2006 | Kuroda | ......................... 403/135 |
| 7,421,785 | B2 * | 9/2008 | Spence et al. | ............ 29/898.051 |
| 2003/0049072 | A1 | 3/2003 | Tamatsu et al. | |
| 2007/0257462 | A1 * | 11/2007 | Fader | .................... 280/124.107 |
| 2011/0150563 | A1 | 6/2011 | Kuroda | |

FOREIGN PATENT DOCUMENTS

| | | |
|---|---|---|
| JP | A-7-54835 | 2/1995 |
| JP | A-2000-65038 | 3/2000 |
| JP | A-2002-89541 | 3/2002 |
| JP | A-2010-65725 | 3/2010 |
| WO | WO 2010/029847 A1 | 3/2010 |

OTHER PUBLICATIONS

May 13, 2014 Supplemental Extended Search Report issued in European Patent Application No. 11841585.0.

* cited by examiner

STABILIZER LINK AND METHOD FOR MANUFACTURING SAME

TECHNICAL FIELD

The present invention relates to a stabilizer link equipped with a ball seat. In particular, the present invention relates to an improvement in a method of fixing the ball seat.

BACKGROUND ART

A stabilizer link is a stabilizer link part connecting a suspension apparatus and a stabilizer apparatus. FIG. 1 is a perspective view showing a schematic structure of front wheel side of vehicle. Each suspension apparatus 10 is provided at left and right tires 30 and has an arm 11 and a cylinder 12. A lower end portion of the arm 11 is fixed at a bearing portion which supports a shaft of the tire 30. The cylinder 12 is elastically movable relatively to the aim 11. A bracket 13, to which a stabilizer link 1 is mounted, is provided at the arm 11. The suspension apparatus 10 supports the weight of vehicle body which is applied to the tire 30. A stabilizer apparatus 20 is equipped with a bar 21 which is approximately U-shaped, and the stabilizer apparatus 20 is mounted to the vehicle body via bushes 22. The stabilizer apparatus 20 secures roll stiffness of vehicle.

The stabilizer links 1 are provided at the bracket 13 of the suspension apparatus 10 and at the end portion of the bar 21 of the stabilizer apparatus 20. The stabilizer links 1 are connected to each other by a support bar 6. The stabilizer link 1 transmits a load, which is generated when the suspension apparatus 10 receives an input from a road surface, to the stabilizer apparatus 20.

FIG. 2 is a side sectional diagram showing a specific example of structure of the stabilizer link 1. The stabilizer link 1 is equipped with a stud ball 2, a ball seat 3, a housing 4, and a dust cover 5.

The stud ball 2 has a stud portion 2A and a ball portion 2B which are integrally formed. A screw portion 2C is formed at a leading end portion of the stud portion 2A. The screw portion 2C of the stabilizer link 1 proximate to the suspension apparatus 10 is fixed at the bracket 13 of the arm 11 by screw fastening, and the screw portion 2C of the stabilizer link 1 proximate to the stabilizer apparatus 20 is fixed at the bar 21 by screw fastening. The ball seat 3 and the housing 4 form a pivot support member which universally supports the stud ball 2.

The ball portion 2B of the stud ball 2 is press-fitted into a concave portion 3A of the ball seat 3, and the concave portion 3A of the ball seat has a bearing function. The housing 4 holds the ball seat 3 therein. The dust cover 5 prevents foreign objects from entering the concave portion 3A of the ball seat 3. The support bar 6, which connects the stabilizer links 1, is provided at a side surface of the housing 4. A thermal caulking portion 3B, which is used as a fixing portion, is formed at a bottom portion of the ball seat 3. In formation of the thermal caulking portion 3B, a pin portion of the ball seat 3 is projected from a hole portion 4A of the housing 4 to an external portion, and the pin portion is deformed by thermal caulking or ultrasonic caulking, so that the deformed pin portion is caulked to the outside of the housing 4. The ball seat 3 is fixed to the housing 4 by the thermal caulking portion 3B (for example, Patent Documents 1 and 2).

In this stabilizer link 1, in order to prevent removal of ball portion 2B of the stud ball 2 from the concave portion 3A of the ball seat 3, it is necessary that pull-out strength be increased. In this case, the strength of the thermal caulking portion 3B, which is a portion for fixing the ball seat 3 to the housing 4, corresponds to the strength of the ball seat 3 made of the same material, so that pull-out strength of the stud ball 2 is determined by the strength of the ball seat 3.

It is thought that a reinforced resin including a reinforcing agent (glass fiber or the like) is used for the ball seat 3 in order to increase the strength of the ball seat 3. However, in this case, the reinforcing agent may have characteristics of attack to the ball portion 2B of the stud ball 2, so that the bearing function of the ball seat 3 may be deteriorated. On the other hand, when polyoxymethylene (POM), which does not include a reinforcing agent, is used as a material of the ball seat 3 in order to prioritize the bearing function, for example, only the pull-out strength of about 2000N to 2800N may be obtained in use of a ball portion of φ16.

The inventor has proposed a hybrid type ball seat obtained by two-color molding in order to realize both increase in pull-out strength and prevention of bearing function deterioration (for example, Patent Document 3). The hybrid type ball seat has a ball receiving portion and a reinforcing portion. The ball receiving portion has a bearing function for universally supporting a ball portion of a stud ball. The reinforcing portion is formed at the outside of the ball receiving portion and made of a reinforced resin.

Patent Document 1 is Japanese Unexamined Patent Application Publication No. Hei 6-117429, Patent Document 2 is Japanese Unexamined Patent Application Publication No. Hei 7-54835, and Patent Document 3 is Japanese Unexamined Patent Application Publication No. 2010-65725.

SUMMARY OF THE INVENTION

Problems Solved by the Invention

However, in the hybrid type ball seat, in a case in which the ball seat is fixed by the thermal caulking portion 3B in the same manner as in the ball seat of the stabilizer link 1, it may be difficult to control the action of the reinforcing agent included in the reinforced resin when thermal caulking or ultrasonic caulking is performed. Due to this, breakage of normal array of reinforcing fiber may easily occur, so that desired pull-out strength cannot be obtained.

Therefore, an object of the present invention is to provide a stabilizer link and a production method therefor which can obtain desired pull-out strength even when a reinforced resin is used for a fixing portion of a ball seat.

Means for Solving the Problems

According to one aspect of the present invention, a production method for a stabilizer link includes: a subassembly forming step in which a subassembly having a stud ball, a main body of a ball seat, and a housing is formed, wherein in the subassembly forming step, a space is formed between a bottom side of a side surface of the main body and a bottom side of an inner surface of the housing; a cavity forming step in which a die is provided to an outer surface of a bottom side of the housing in the subassembly and a cavity is thereby formed; and an injection molding step in which injection molding is performed such that a reinforced resin is injected into the cavity and the space, and a fixing portion of the ball seat is thereby formed so as to cover the bottom side of the side surface of the main body, wherein in formation of the main body of the ball seat, a first fit shape including at least one of a recess and a protrusion is formed at the bottom side of the side surface of the main body, and in formation of the fixing portion of the ball seat, a resin including a reinforcing agent is used as the reinforced resin, the reinforced resin is flowed to an outer surface of the side surface of the main body through a hole of the housing, so that a second fit shape fitted to the first fit shape is formed at the fixing portion, a projection projecting from the hole of the housing to an external is formed at a bottom of the fixing portion, and the projection is formed to have a shape engaging with the outer surface of the bottom of the housing.

In the production method for stabilizer link according to the above aspect of the present invention, the subassembly is formed such that the space is formed between the bottom side of the side surface of the main body and the bottom side of the inner surface of the housing. The die is provided to the outer surface of the bottom side of the housing in the subassembly, and the cavity is thereby formed. The injection molding is performed such that the reinforced resin is injected into the cavity and the space, and the fixing portion is thereby formed at the ball seat so as to cover the bottom side of the side surface of the main body.

In the formation of the fixing portion of the ball seat, the reinforced resin is flowed to the outer surface of the side surface of the main body via the hole of the housing, the second fit shape fitted to the first fit shape of the main body is formed at the fixing portion. Thus, the main body and the fixing portion can mechanically engage with each other by the fitting portion formed by the first fit shape (main body side fit shape) and the second fit shape (fixing portion side fit shape). Therefore, in the ball seat, removal of the main body from the fixing portion can be prevented without chemical combination of the respective resins which are the materials of the main body and the fixing portion. The projection of the fixing portion is formed to have the shape engaging with the outer surface of the bottom of the housing, so that removal of the fixing portion from the housing can be prevented.

In the production method for stabilizer link according to the above aspect of the present invention, the reinforced resin including the reinforcing agent is injected in the injection molding, so that normal array of the reinforcing agent (reinforcing fiber or the like) can easily be obtained differently from the conventional caulking methods (thermal caulking, ultrasonic caulking, and the like). Thus, the fixing portion can obtain the inherent strength of the reinforced resin, so that desired pull-out strength of the stud ball can be obtained. In this case, in the fixture of the fixing portion to the main body, as described above, chemical combination of the respective resins of the main body and the fixing portion is unnecessary, and consideration of the combination compatibility between the resins is unnecessary, so that selection of the resins used in the injection molding can be wider. The outer surfaces of the bottoms of the projection of the fixing portion and the housing can strongly contact each other by molding shrinkage of the injected reinforced resin, so that characteristics of sealing from muddy water or the like from an external can be improved.

The production method for stabilizer link according to the above aspect of the present invention can use various structures. For example, according to one desirable embodiment of the present invention, a feature can be used in which another hole is formed at the bottom of the housing, and in the formation of the fixing portion of the ball seat, in injection of the reinforced resin into the cavity and the space, a gas is discharged from the another hole, another projection projecting from the another hole to an external is formed, and the another projection is formed to have a shape engaging with the outer surface of the bottom of the housing. In this feature, rotation of the ball seat relative to the housing about an axis can be effectively prevented.

According to another aspect of the present invention, a stabilizer link is produced by the production method for stabilizer link according to the above aspect of the present invention. That is, a stabilizer link includes: a stud ball having a ball; a ball seat having a main body and a fixing portion, the ball is slidably fitted into the main body, the fixing portion formed so as to cover a bottom side of a side surface of the main body; and a housing holding the ball seat therein and having a hole at a bottom thereof, wherein the fixing portion is made of a reinforced resin including a reinforcing agent, a first fit shape including at least one of a recess and a protrusion is formed at the bottom side of the side surface of the main body, and a second fit shape fitted to the first fit shape is formed at the fixing portion, and a projection projecting from the hole of the housing to an outside is formed at a bottom of the fixing portion, and the projection is formed to have a shape engaging with an outer surface of the bottom of the housing. The stabilizer link of the above aspect of the present invention can obtain the same effects as those of the production method for stabilizer link according to the above aspect of the present invention.

The stabilizer link of the above aspect of the present invention can use various structures. For example, according to one desirable embodiment of the present invention, a feature can be used in which the main body of the ball seat has a ball receiving portion and a reinforcing portion, the ball is slidably fitted into ball receiving portion, the reinforcing portion formed at an outside of the ball receiving portion and made of a reinforced resin, the first fit shape is formed at a bottom side of a side surface of the reinforcing portion, and the fixing portion is formed so as to cover the bottom side of the side surface of the reinforcing portion.

Effects of the Invention

According to the stabilizer link or the production method therefor, the desired pull-out strength can be obtained even when the reinforced resin is used for the fixing portion of the ball seat, and another effect can be obtained.

BRIEF DESCRIPTION OF DRAWINGS

FIG. 10A is a side cross sectional diagram showing a condition of injection molding. FIG. 10B is a plan view showing a lower surface of a bottom portion of a housing.

EXPLANATION OF REFERENCE NUMERALS

Figure 1:
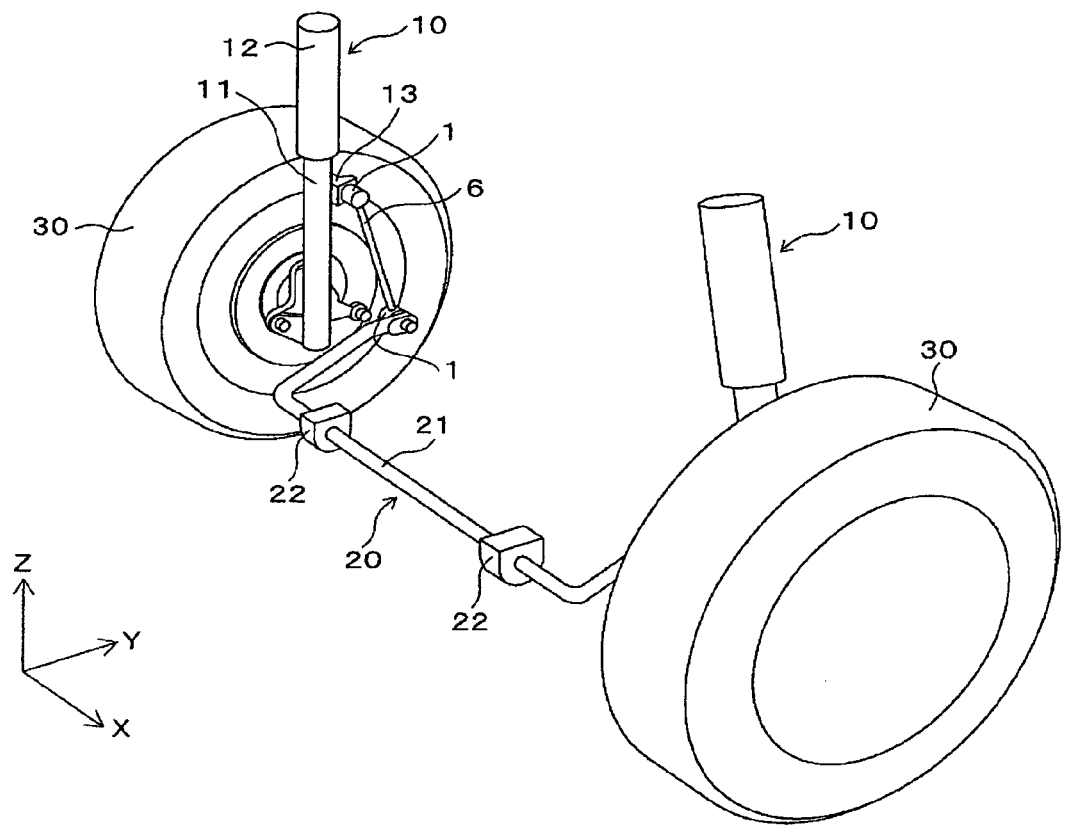
FIG. 1 is a perspective view showing a schematic structure of a front wheel side of vehicle.

Reference numeral 100 and 800 denote a stabilizer link, 100A denotes a subassembly, 101 denotes a stud ball, 120 denotes a ball portion, 200 and 810 denotes a ball seat, 201 and 811 denote a main body portion, 202 and 812 denote a fixing portion, 221 and 821 denote a fixing groove portion (recess, first fit shape), 223 denotes a fixing protrusion portion (first fit shape), 224 denotes a fixing protrusion stripe portion (protrusion, first fit shape), 231 and 831 denote a fixing protrusion stripe portion (protrusion, second fit shape), 232 and 832 denote a projection portion (projection, another projection), 4 and 300 denote a housing, 4A and 320 denote a hole portion, 600 denotes an injection molding die (die), 600A denotes a hole portion (hole, another hole), and reference symbol C denotes a cavity, G denotes a gas, R denotes a reinforced resin, S denotes a space.

Description of Preferred Embodiments

1. Structure of Stabilizer Link
1.1. Overall Structure

Figure 3:
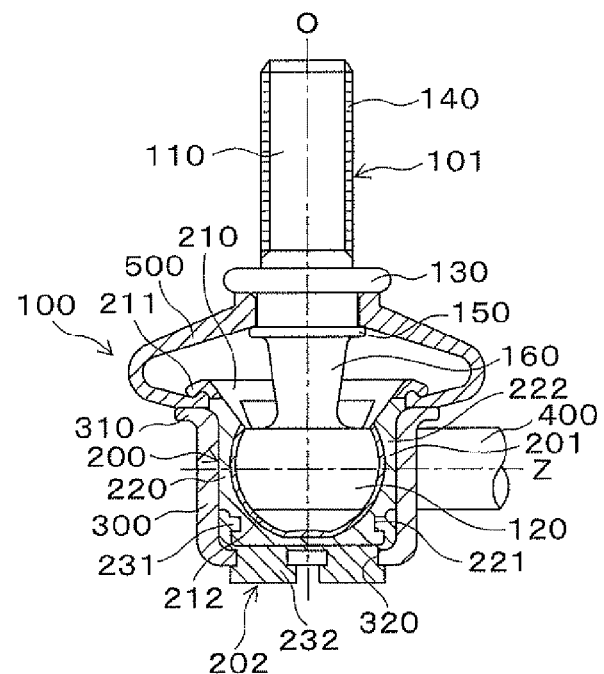
FIG. 3 is a side cross sectional diagram showing a structure of a stabilizer link of one embodiment according to the present invention.
Figure 4:
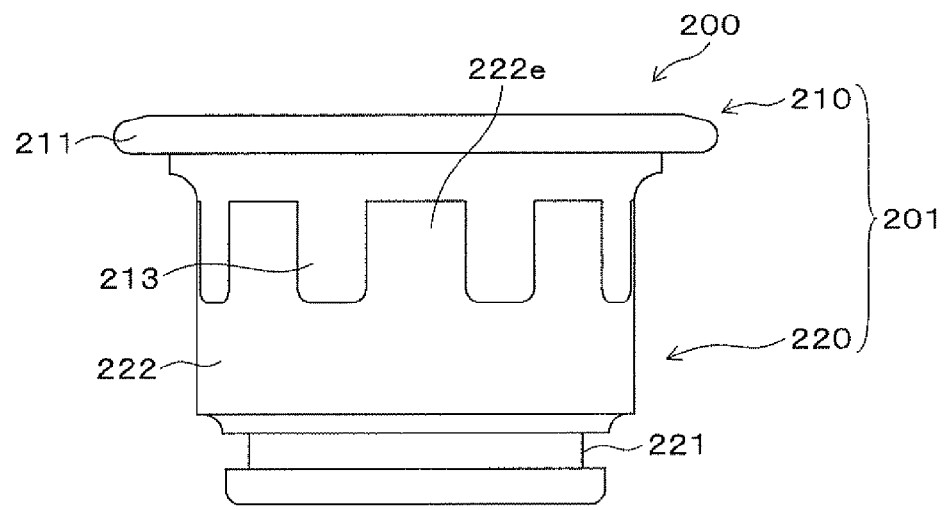
FIG. 4 is a side view showing a structure of a main body portion of a ball seat of a stabilizer link of one embodiment according to the present invention.
Figure 5:
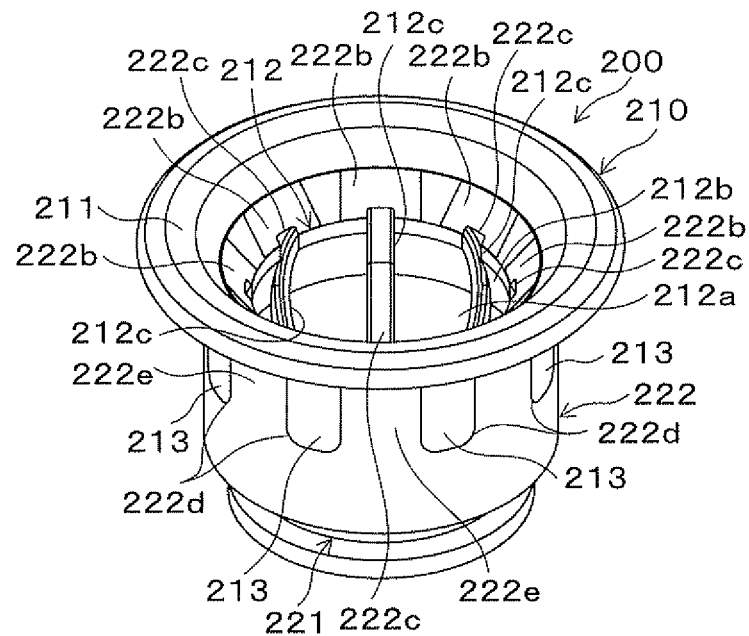
FIG. 5 is a perspective view showing a structure of the main body portion of the ball seat shown in FIG. 4.
Figure 6:
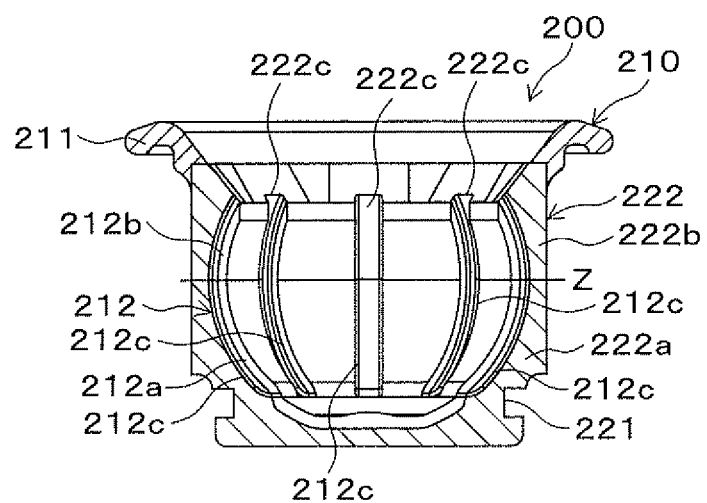
FIG. 6 is a side cross sectional diagram showing a structure of the main body portion of the ball seat shown in FIG. 4.
Figure 7:
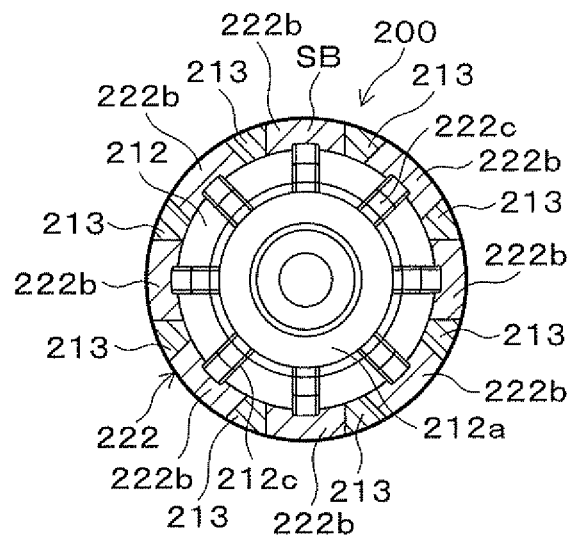
FIG. 7 is a cross sectional diagram showing a structure of the main body portion of the ball seat shown in FIG. 4.
Figure 8:
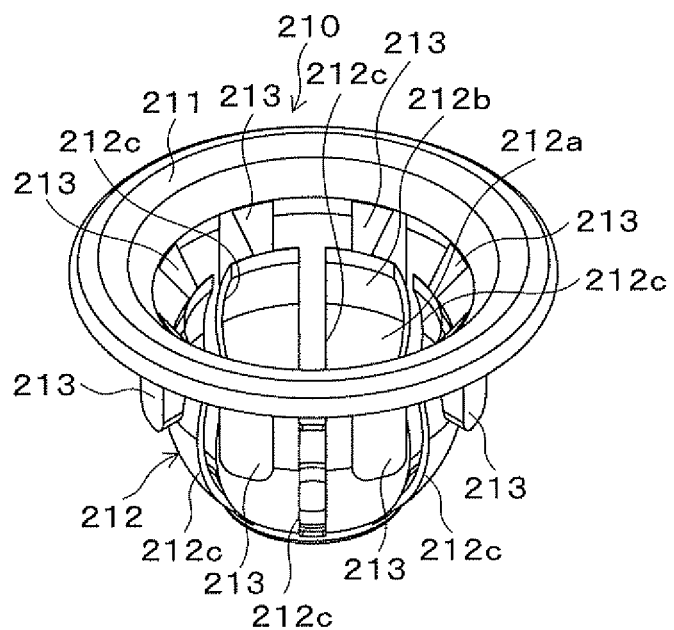
FIG. 8 is a perspective view showing a structure of a ball receiving portion of the main body portion shown in FIG. 4.
Figure 9:
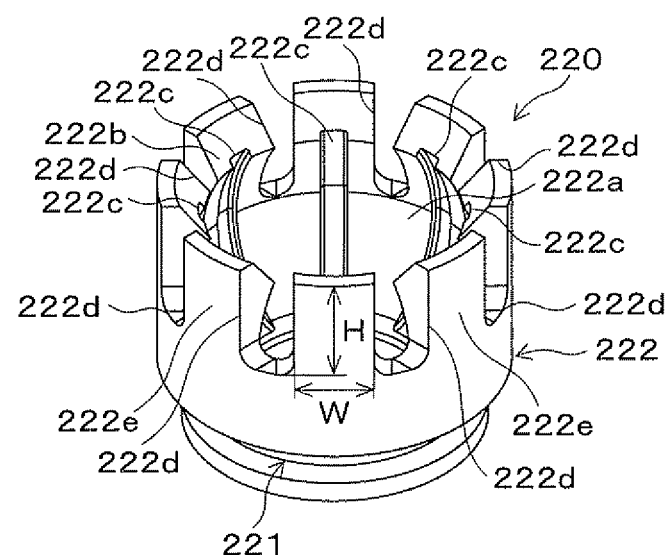
FIG. 9 is a perspective view showing a structure of a reinforcing portion of the main body portion shown in FIG. 4.

An embodiment of the present invention will be explained hereinafter with reference to Figures. FIG. 3 is a side cross sectional diagram showing a structure of a stabilizer link of an embodiment according to the present invention. FIG. 4 is a side view showing a structure of a main body portion of a ball seat of a stabilizer link of one embodiment according to the present invention. FIG. 5 is a perspective view showing a structure of the main body portion of the ball seat shown in FIG. 4. FIG. 6 is a side cross sectional diagram showing a structure of the main body portion of the ball seat shown in FIG. 4. FIG. 7 is a cross sectional diagram showing a structure of the main body portion of the ball seat shown in FIG. 4. FIG. 8 is a perspective view showing a structure of a ball receiving portion of the main body portion shown in FIG. 4. FIG. 9 is a perspective view showing a structure of a reinforcing portion of the main body portion shown in FIG. 4.

As shown in FIG. 3, a stabilizer link 100 is equipped with a stud ball 101, a ball seat 200, a housing 300, a support bar 400, and a dust cover 500.

The stud ball 101 is made of metal and is integrally formed. As shown in FIG. 3, the stud ball 101 has a stud portion 110, a ball portion 120, a flange portion 130, a screw portion 140, a protruding portion 150, and a tapered portion 160. For example, the stud portion 110 has a columnar shape. The ball portion 120 has a spherical shape and is formed at a lower end portion of the stud portion 110. The ball portion 120 has a center positioned on an axis O of the stud portion 110. The flange portion 130 and the protruding portion 150 are formed at an axis O direction middle portion of the stud portion 110.

The screw portion 140 is formed at a leading end portion of the stud portion 110. The tapered portion 160 is formed between the protruding portion 150 and the ball portion 120.

The ball seat 200 has a main body portion 201 and a fixing portion 202. The main body portion 201 has a ball receiving portion 210 and a reinforcing portion 220. The ball receiving portion 210 universally supports the ball portion 120 of the stud ball 101. The reinforcing portion 220 is formed at the outside of the ball receiving portion 210. The ball seat 200 is held in the housing 300 and is fixed at a bottom portion of the housing 300 by the fixing portion 202.

The housing 300 has a flange portion 310 and a hole portion 320. The flange portion 310 is provided at an end portion of an opening side of the housing 300. The hole portion 320 is formed at a bottom portion of the housing 300. An end portion of the support bar 400 extending in a radial direction is fixed to an outer surface of a side surface portion of the housing 300. In the dust cover 500, an end edge portion at a greater diameter side is held between the flange portion 211 of the ball seat 200 and the flange portion 310 of the housing 300, and an end edge portion at a smaller diameter side is fixed between the flange portion 130 of the stud ball 101 and the protruding portion 150.

1.2. Structure of Ball Seat
A. Material of Ball Seat

In the ball seat 200, for example, material of the ball receiving portion 210 of the main body portion 201 is selected from the following first materials, for example, material of the reinforcing portion 220 of the main body portion 201 is selected from the following second materials, and, for example, material of the fixing portion 202 is selected from the following second materials. In this case, the materials of the reinforcing portion 220 and the fixing portion 202 may be different from each other.

The first materials are resins such as polyoxymethylene (POM), polypropylene (PP), polytetrafluoroethylene (PTFE), polybutylene terephthalate (PBT), polyether ether ketone (PEEK), nylon 66 (PA66), and the like. The second materials are reinforced resins and the like which are obtained by adding a reinforcing fiber (reinforcing agent) such as glass fiber (GF), carbon fiber (CF), or the like, to a resin such as polyoxymethylene (POM), polypropylene (PP), polytetrafluoroethylene (PTFE), polybutylene terephthalate (PBT), polyether ether ketone (PEEK), nylon 66 (PA66) or the like.

The second material is added to only a portion of the ball seat 200 (that is, the reinforcing portion 220 and the fixing portion 202), so that use amount of the second material, which is an expensive material, can be reduced. Thus, production cost can be reduced. The added amount of glass fiber (GF), carbon fiber (CF), or the like, is preferably set to be approximately 10 to 30%. By using such an amount of glass fiber (GF), carbon fiber (CF), or the like, the production cost of the stabilizer link 100 can be reduced while the strength of the ball seat is maintained. For example, nylon 66 (PA66) including 30 wt % of glass fiber (OF) is desirably used as the second material. In this case, for example, the stabilizer link using a ball portion of φ16 can obtain a pull-out strength of not less than 6000N.

B. Structure of Main Body Portion
B-1. Structure of Ball Receiving Portion

For example, as shown in FIG. 8, the ball receiving portion 210 of the main body portion 201 has a flange portion 211, a concave portion 212, and protruding portions 213. The ball receiving portion 210 is formed of polyoxymethylene (POM) which is an example of the first material. The flange portion 211, the concave portion 212, and the protruding portions 213 are integrally formed.

For example, the flange portion 211 is provided at an opening side of the ball receiving portion 210. The flange portion 211 protrudes toward the outside of the ball receiving portion 210. The inside of the concave portion 212 has a spherical shape corresponding to the shape of the outer surface of the ball portion 120. The outside of the concave portion 212 has a spherical shape which is similar to the inside shape of the concave portion 212. The concave portion 212 has a receiving portion 212a, an overhang portion 212b, and grease grooves 212c. The ball portion 120 of the ball stud 101 is slidably fitted to the concave portion 212.

For example, the receiving portion 212a is provided at the bottom side of the concave portion 212 from the center Z of the ball portion 120. The receiving portion 212a has a hemispherical shape corresponding to the shape of the side surface of the ball portion 120. The receiving portion 212a receives pressure when the ball stud 101 is pressed toward the bottom side of the ball seat 200.

For example, the overhang portion 212b is provided at the opening side of the concave portion 212 from the center Z of the ball portion 120. The overhang portion 212b has a shape corresponding to the shape of the side surface of the ball portion 120. The overhang portion 212b overhangs the ball portion 120. Therefore, when the pullout force is applied to the ball stud 100 and the overhang portion 212b thereby receives the pullout load, the overhang portion 212b withstands the pullout load, and removal of the ball portion 120 from the concave portion 212 can be prevented by the overhang portion 212b.

For example, the plural grease grooves 212c are formed so as to extend from the bottom side to the opening side of the concave portion 212, and are provided in the circumferential direction of the concave portion 212 at predetermined intervals. The number of the grease grooves 212c may be suitably selected and, for example, is eight. The grease grooves 212c are paths so that grease, which is filled in the insides of the concave portion 212 and the dust cover 500, can move in a space formed between the top and the bottom of the ball portion 120. The grease grooves 212c facilitate a heat cycle in which the grease absorbs heat and radiates the heat, and absorbs heat again.

For example, plural protruding portions 213 are provided at the outer circumferential wall at the opening side of the concave portion 212 at predetermined intervals. The protruding portion 213 is provided at the middle of the adjacent grease grooves 212c of the concave portion 212. The number of the grease grooves 212c may be suitably selected and, for example, is eight.

B-2. Structure of Reinforcing Portion

For example, as shown in FIG. 9, the reinforcing portion 220 of the main body portion 201 has a fixing groove portion 221 and a holding portion 222. In the reinforcing portion 220, for example, nylon 66 (PA66) including 30 wt % of glass fiber (GF) is used as the second material.

Figure 12:
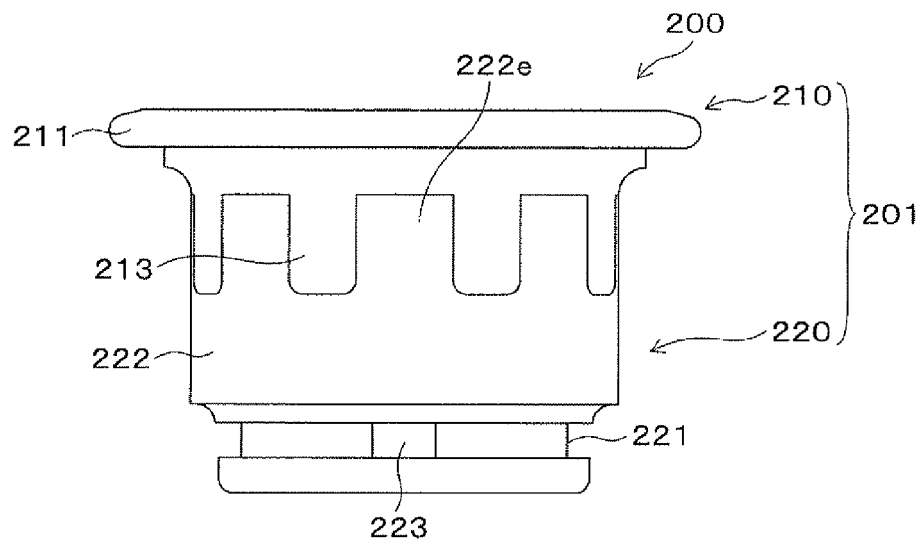
FIG. 12 is a side view showing a structure of a modification example of a main body portion of a ball seat of a stabilizer link of one embodiment according to the present invention.
Figure 13:
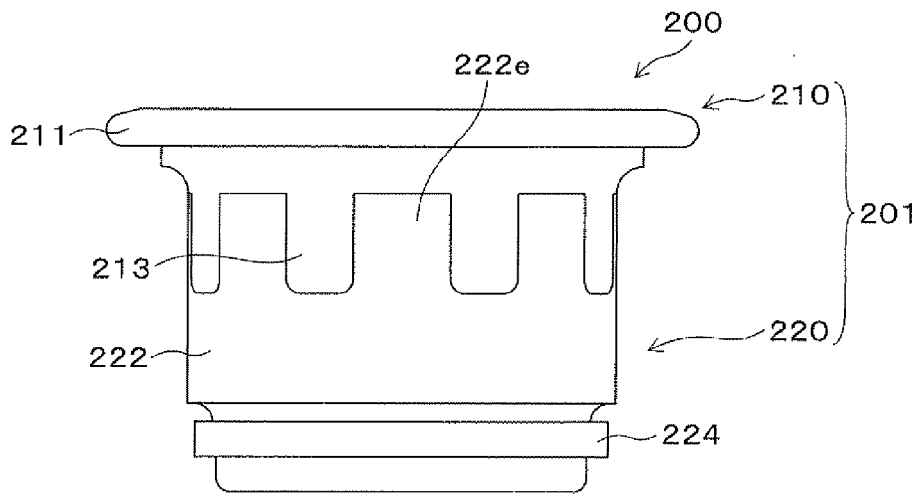
FIG. 13 is a side view showing a structure of another modification example of a main body portion of a ball seat of a stabilizer link of one embodiment according to the present invention.

The fixing groove portion 221 is formed at an outer surface of side surface of the holding portion 222 so as to extend in a circumferential direction. The fixing groove portion 221 has a recessed shape. The fixing groove portion 221 may be formed at the entire circumference of the outer surface of the side surface or may discretely be formed by providing a fixing groove portion 223 at a surface of the fixing groove portion 221 as shown in FIG. 12. The number of the fixing groove portions 221 may be plural as long as a height direction space allows formation of the fixing groove portions 221. As shown in FIG. 13, instead of the fixing groove portion 221, a fixing protrusion stripe portion 224 extending in a circumferential direction may be provided at the bottom portion side of the outer surface of the side surface portion of the holding portion 222.

For example, the holding portion 222 covers the outside of the concave portion 212 by closely adhering thereto. Thus, the holding portion 222 having higher strength than that of the concave portion 212 can be prevented from contacting the ball portion 120, so that deterioration of the surface roughness of the ball portion 120 can be prevented, and partial wear of the ball portion 120 can be prevented. Thus, damage of the ball portion 120 by the holding portion 222 can be prevented. As a result, the function of the stabilizer link 100 can be improved, so that the reliability of the stabilizer link 100 can be improved.

The inside of the holding portion 222 has a spherical shape corresponding to that of the outside of the concave portion 212. When the concave portion 212 of the ball receiving portion 210 receives the pullout load, the holding portion 222 can hold the concave portion 212. As a result, the function of the stabilizer link 100 can be improved, so that the reliability of the stabilizer link 100 can be improved.

For example, the holding portion 222 has an outside shape which is a cylindrical shape having a bottom, and is press-fitted into the inside of the housing 300. The holding portion 222 has a supporting portion 222a, a backup portion 222b, grease groove portions 222c, and slits 222d. The holding portion 222 holds the concave portion 212 of the ball receiving portion 210.

The supporting portion 222a is provided at the bottom side of the holding portion 222 from the center Z of the ball portion 120. The supporting portion 222a has a shape corresponding to the outside shape of the concave portion 212. The supporting portion 222a supports the receiving portion 212a of the ball receiving portion 210.

The backup portion 222b is provided at the opening side of the holding portion 222 from the center Z of the ball portion 120. The backup portion 222b overhangs the overhang portion 212b. The backup portion 222b reinforces the overhang portion 212b which directly receives the pullout load of the backup portion 222b. When the overhang portion 212b of the concave portion 222 receives the pullout load, the backup portion 222b withstands the pullout load, and removal of the ball portion 120 from the concave portion 212 can be prevented by the backup portion 222b. As a result, breakage of the stabilizer link 100 can be prevented, so that the reliability of the stabilizer link 100 can be improved.

The backup portion 222b reinforces the overhang portion 212b, and the flange portion 211 and the concave portion 212 are integrally formed. Therefore, even when the concave portion 212 receives the pullout load, damage of the concave portion 212 can be prevented, and removal of the dust cover 500 can be prevented. When the concave portion 212 receives the pullout load, the removal of concave portion 212 from the holding portion 222 can be prevented even if the concave portion 212 is separated at the boundary between the ball receiving portion 210 and the reinforcing portion 220.

For example, plural convex portions 222e are formed at the backup portion 222b by providing plural slits 222d. In a case in which the ball portion 120 of the stud ball 101 is pressed into the concave portion 212 of the ball seat 200, in a case in which a core is provided in the concave portion 212 of the ball receiving portion 210 and is removed therefrom after molding of the ball seat 200 having the ball receiving portion 210 and the holding portion 222, and the like, the convex portions 222e of the backup portion 222b are pressed toward the outside, and the opening portion of the ball seat 200 can open widely. Thus, the ball portion 120 can be pressed into the concave portion 212, and the core can be removed from the concave portion 212.

The backup portion 222b withstands the pullout load, and removal of the ball portion 120 from the concave portion 212 can be prevented by the backup portion 222b even when the plural convex portions 222e are formed. Specifically, when the ball portion 120 of the stud ball 101 is fitted into the concave portion 212 of the ball seat 200 and then the ball seat 200 is provided in the housing 300, increase in outer diameter of the backup portion 222b is prevented by the housing 300, so that expansion of the opening portion of the ball seat 200 can be inhibited, and the backup portion 222b withstands the pullout load, and removal of the ball portion 120 from the concave portion 212 can be prevented by the backup portion 222b.

For example, the convex portion 222e is provided such that the grease groove portion 222c is positioned at the center of the convex portion 222e. The width W of the convex portion 222e is set such that the convex portion 222e uniformly extends toward both sides around the grease groove portion 222c. The height H of the convex portion 222e is a height from the center Z of the ball portion 120 to the opening portion. As long as the stiffness of the convex portion 222e can be secured and the ball portion 120 can be fitted into the concave portion 212, the height H of the convex portion 222e may be suitably changed. The number of the convex portions 222e is set to be the same as that of the grease groove portions 222c, and is, for example, eight.

The height H and the width W of the convex portion 222e are set so as to satisfy the following first formula.

$$1.0 \leq (\text{height } H \text{ of the convex portion})/(\text{width } W \text{ of the convex portion}) \leq 2.0 \quad \text{First Formula}$$

For example, the height H of the convex portion 222e is set to be about 7 mm, and the width W of the convex portion 222e is set to be about 4 mm. The height H and the width W of the convex portion 222e are set so as to satisfy the first formula, so that the elasticity of the backup portion 222b can be maintained, and the strength of the backup portion 222b can be improved.

The protruding portions 213 of the ball receiving portion 210 are fitted to the slits 222d of the reinforcing portion 220. Thus, the concave portion 212 engages with the holding portion 222, thereby preventing rotating of the concave portion 212. An exposed portion of the ball receiving portion 210 is provided at the outer circumference of the ball seat 200, and a fit margin between the housing 300 and the ball seat 200 is set, so that the torque of the stabilizer link 100 can be adjusted such that the ball portion 120 can slide.

For example, the grease groove portions 222c are disposed so as to overlap the grease grooves 212c of the concave portion 212 at the inside of the holding portion 222, and extend from the bottom side to the opening side of the holding portion 222. For example, the number of the grease groove portions 222c is eight. The grease groove portions 222c are paths so that grease, which is filled at the inside of the concave portion 212 and the dust cover 500, moves in the space formed between the top and the bottom of the ball portion 120. The grease groove portions 222c facilitate a heat cycle in which the grease absorbs heat and radiates the heat, and absorbs heat again. The grease grooves 212c and the grease groove portions 222c are grease flow passageways for circulating the grease.

In the grease flow passageways, the grease grooves 212c are provided to the concave portion 212, and the concave portion 212 is not covered with the holding portion 222.

Therefore, the grease groove portions 222c are provided to the holding portion 222, so that contact between the ball portion 120 and the holding portion 222 is prevented.

C. Structure of Fixing Portion

For example, as shown in FIG. 3, the fixing portion 202 is formed so as to cover the bottom portion side of the outer surface of the side surface portion of the holding portion 222. A fixing protrusion stripe portion 231, which is fitted to the fixing groove portion 221 of the reinforcing portion 220, is formed at the fixing portion 202. The fixing protrusion stripe portion 231 and the fixing groove portion 221 form a fitting portion and can mechanically engage with each other. A projection portion 232 projecting from the hole portion 320 of the housing 300 to an external portion is formed at a bottom portion of the fixing portion 202. A leading end portion of the projection portion 232 has a shape to engage with an outer surface of the bottom portion of the housing 300, and has, for example, a bottom shape. The projection portion 232 can prevent removal of the fixing portion 202 from the housing 300.

In this case, since the second material which is the reinforced resin is used as the material of the fitting portion (the fixing groove portion 221 and the fixing protrusion stripe portion 231) and the projection portion 232, the fitting portion and the projection portion 232 withstand the pullout load, and thereby removal of the ball seat 200 from the housing 300 can be effectively prevented. As a result, breakage of the stabilizer link 100 can be prevented, so that the reliability of the stabilizer link 100 can be improved.

The shape and the number of the fixing protrusion stripe portion 231 correspond to those of the fixing groove portion 221 of the reinforcing portion 220. When the fixing protrusion stripe portion 224 shown in FIG. 13 is provided at the outer surface of the side surface portion instead of the fixing groove portion 221, a fixing groove portion having a shape corresponding to that of the fixing protrusion stripe portion 224 is formed at the fixing portion 202. The projection portion 232 is provided at a position spaced from the center of the bottom portion of the housing 300, so that rotation of the ball seat 200 relative to the housing 300 can be prevented. The cross sectional shape of the pole portion of the projection portion is asymmetric with respect to the center thereof, so that rotation of the ball seat 200 relative to the housing 300 can be prevented. The number of the projection portions 232 can be suitably selected, and is, for example, two. In this case, rotation of the ball seat 200 relative to the housing 300 can be effectively prevented.

Figure 2:
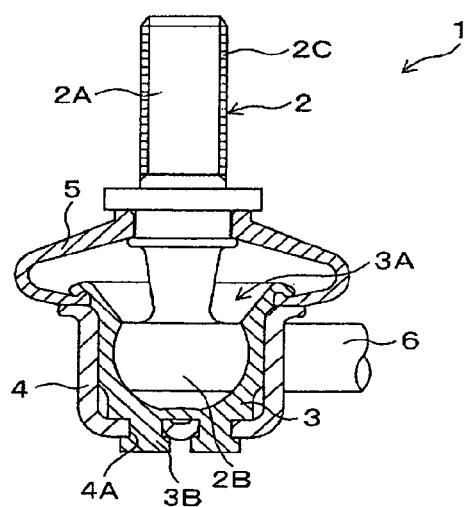
FIG. 2 is a side cross sectional diagram showing a structure of a conventional stabilizer link.

In designing of the projection portion 232, for example, the value obtained by multiplying total cross sectional area of the pole portions of the projection portions formed in the hole portions 320 by tensile breakage strength (that is, the value obtained by (total cross sectional area of the pole portions)× (tensile breakage strength)) is desirably set to be not less than 2 kN when a ball portion of ϕ16 is used as the ball portion of the stud ball. For example, in a case in which cross sectional areas of all the pole portions (cross sectional areas of all the hole portions 320) are the same, the above total cross sectional area of the pole portions is the value obtained by (the number of the pole portions)×(cross sectional area of the one pole portion). In a case in which nylon 66 (PA66) including 30 wt % of glass fiber (GF) is used as the material of the fixing portion 202, the pull-out strength can be about two times as that in a case in which polyoxymethylene (POM) is used as the material of the ball seat 3 of the conventional stabilizer link 1 shown in FIG. 2 and cross sectional area of the pole portion is equal to that in the above case of this embodiment.

2. Production Method for Stabilizer Links

Next, one example of a production method for the stabilizer link 100 will be explained with reference to the Figures.

Figure 10A:
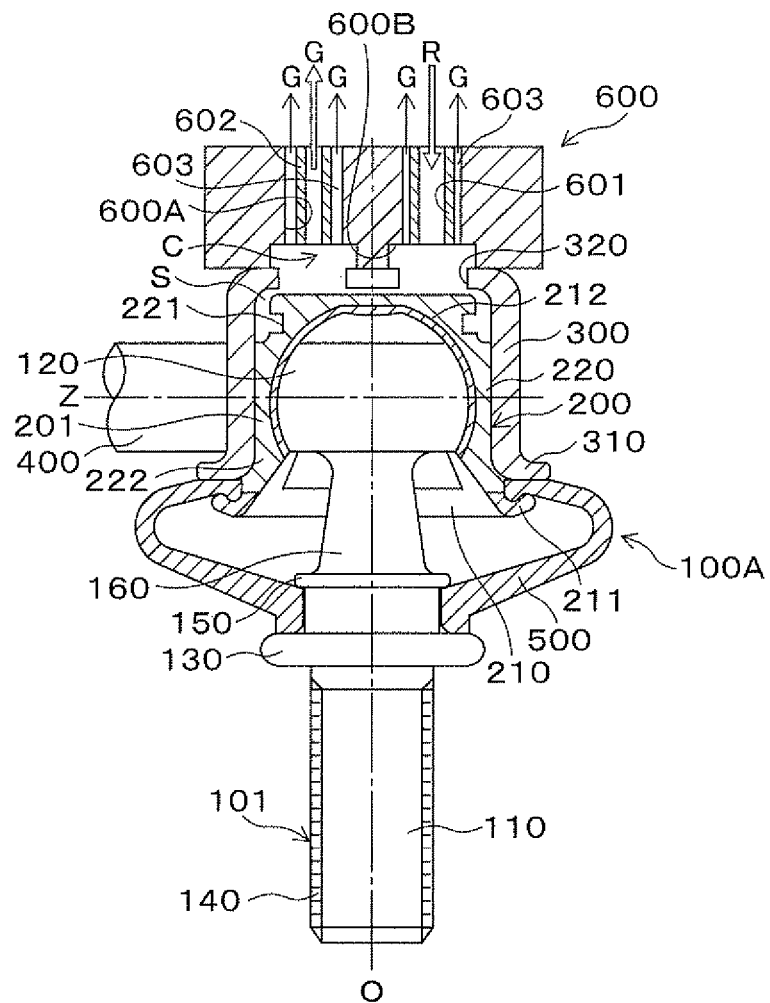
FIGS. 10A and 10B are diagrams for explaining injection molding of a production method for stabilizer links according to one embodiment of the present invention.

First, as shown in FIG. 10A, a subassembly 100A, which has the stud ball 101, the main body portion 201 of the ball seat 200, the housing 300, the support bar 400 and the dust cover 500, is formed. In the formation of the subassembly 100A, a space S is formed between the bottom portion side of the outer surface of the side surface portion of the holding portion 222 of the main body portion 201 and the bottom portion side of the inner surface of the housing 300.

Figure 10B:
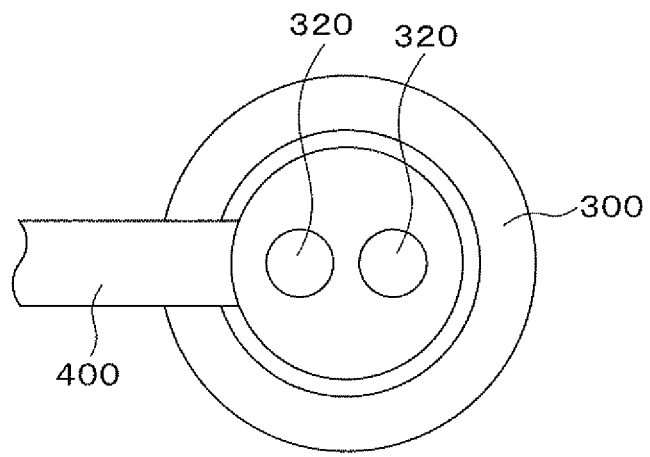

In this case, the subassembly 100A has the same structure as that shown in FIG. 3 other than not forming of the fixing portion 202 of the ball seat 200. For example, the main body portion 201 of the ball seat 200 is obtained by a method proposed by the inventor in Patent Document 1. In formation of the main body portion 201, the fixing groove portion 221 is formed at the outer surface of the side surface portion of the reinforcing portion 220. In the housing 300, for example, as shown in FIG. 10B, the number of the hole portions 320 is set to be two, and the positions thereof are set to be symmetric with respect to the center of the bottom portion of the housing 300.

Next, an injection molding die 600 (hereinafter simply referred to as "die 600") is provided to the outer surface of the bottom portion side of the housing 300 in the subassembly 100A, and a cavity C is thereby formed. In this case, the bottom portion of the housing 300 is disposed so as to be directed to the upper side. The die 600 has hole portions 600A positioned so as to face the hole portions 320 of the housing 300, and wide width portions 600B, which have a shape corresponding to that of the projection portions 232 of the fixing portion 202, are formed at end portion sides of the hole portions 600A proximate to the housing.

Figure 11:
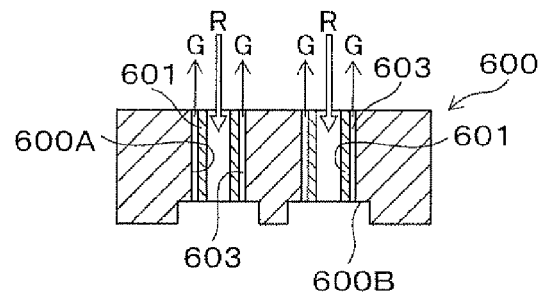
FIG. 11 is a side cross sectional diagram showing a modification example of a die used in the injection molding shown in FIGS. 10A and 10B.

A resin injection gate 601 is inserted into one of the hole portions 600A of the die 600, and a gas discharge member 602 is inserted into another of the hole portions 600A of the die 600. A reinforced resin R is injected from a hole portion of the resin injection gate 601, and a gas G is discharged from a hole portion of the resin injection gate 601. A gap 603 is provided between an inner peripheral surface of the hole portion 600A and an outer peripheral surface of a sleeve of the resin injection gate 601, and a gap 603 is provided between an inner peripheral surface of the hole portion 600A and an outer peripheral surface of a sleeve of the gas discharge member 602. The gaps 603 are gas discharge clearances. The gap 603 in the hole portion 600A at the side of the gas discharge member 602 has a clearance which is set to be larger than that of the gap 603 in the hole portion 600A at the side of the resin injection gate 601. As shown in FIG. 11, the resin injection gate 601 may be inserted to both of the hole portions 600A. In FIGS. 10A, 10B, and 11, for the drawing convenience, the clearance of each gaps 603 is shown to be large. The shape of the hole portion 320 corresponding to that of the pole portion of the projection portion 232 is not limited as long as resin injection and gas discharge can be performed. For example, this shape may be a column shape or a rectangular column shape, and the cross sectional shape thereof is not limited.

Next, injection molding is performed such that the reinforced resin R which is the second material is injected into the cavity C and the space S. In this case, the reinforced resin R is injected from the hole portion of the resin injection gate 601. The gas G is discharged from the hole portion of the gas discharge member 602 and the gaps 603. In this injection molding, the fixing portion 202 is formed at the bottom portion side of the side surface portion of the holding portion 222 of the main body portion 201. In the formation of the fixing portion 202, the reinforced resin R is flowed to the outer surface of the side surface portion of the holding portion 222, so that the fixing protrusion stripe portion 231, which is fitted to the fixing groove portion 221 of the holding portion 222, is formed at the fixing portion 202, and the projection portion 232, which projects from the hole portion 320 of the housing 300 to an external portion, is formed at the bottom portion of the fixing portion 202, and the projection portion 232 is formed to have a shape engaging with the outer surface of the bottom portion of the housing 300. As a result, the stabilizer link 100 shown in FIG. 3 is produced.

As described above, in this embodiment, in the formation of the fixing portion 202 of the ball seat 202, the reinforced resin R is flowed to the outer surface of the side surface portion of the main body portion 201 via the hole portion 320 of the housing 300, and the fixing protrusion stripe portion 231 (second fit shape) fitted to the fixing groove portion 221 (first fit shape) is formed at the fixing portion 202. Thus, the main body portion 201 and the fixing portion 202 can mechanically engage with each other by the fitting portion formed by the fixing groove portion 221 and the fixing protrusion stripe portion 231. Therefore, in the ball seat 200, removal of the main body portion 201 from the fixing portion 202 can be prevented without chemical combination of the respective resins which are the materials of the main body portion 201 and the fixing portion 202. The projection portion 232 of the fixing portion 202 is formed to have a shape engaging with the outer surface of the bottom portion of the housing 300, so that removal of the fixing portion 202 from the housing 300 can be prevented.

In this embodiment, the reinforced resin R including the reinforcing agent is injected by the injection molding, so that normal array of the reinforcing agent (reinforcing fiber or the like) can easily be obtained differently from the conventional caulking methods (thermal caulking, ultrasonic caulking, and the like). Thus, the fixing portion 202 can obtain the inherent strength of the reinforced resin, so that desired pull-out strength of the stud ball 101 can be obtained. In this case, in the fixture of the fixing portion 202 to the main body portion 201, as described above, chemical combination of the respective resins of the main body portion 201 and the fixing portion 202 is unnecessary, and consideration of the combination compatibility between the resins is unnecessary, so that selection of the resins used in the injection molding can be wider. The outer surfaces of the bottom portions of the projection portions 232 of the fixing portion 202 and the housing 300 can strongly contact each other by molding shrinkage of the injected reinforced resin, so that characteristics of sealing from muddy water or the like from an external portion can be improved.

3. Modification Example

Figure 14:
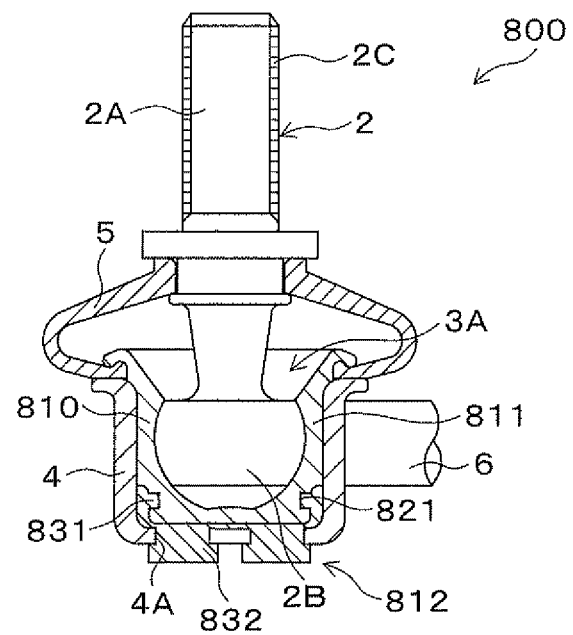
FIG. 14 is a side cross sectional diagram showing a modification example of a stabilizer link of one embodiment according to the present invention.

Although the present invention is explained by using the above embodiment as described above, the present invention is not limited to the above embodiment, and various modifications can be made. Although the present invention is used for the hybrid type ball seat having the ball receiving portion and the reinforcing portion in the above embodiment, the present invention is not limited to this. For example, the present invention may be used for a ball seat made of a single material. FIG. 14 is a side cross sectional diagram showing a modification example of a stabilizer link of one embodiment according to the present invention. A stabilizer link 800 has the same structure as that of the stabilizer link 100 shown in FIG. 2 other than the ball seat.

A ball seat 800 has a main body portion 811 and a fixing portion 812. For example, a material of the main body portion 811 is selected from the group of the first materials, and a material of the fixing portion 812 is selected from the group of the second materials. A fixing groove portion 821, which has the same shape as that of the fixing groove portion 221 of the above embodiment, is formed at a bottom portion side of outer surface of side surface portion of the main body portion 811. A fixing protrusion stripe portion 831, which is fitted to the fixing groove portion 821 of the main body portion 811, is formed at the fixing portion 812. A projection portion 832 projecting from the hole portion 4A of the housing 4 to an external portion is formed at a bottom portion of the fixing portion 812. The projection portion 832 has the same shape as that of the projection portion 232 of the above embodiment. The fixing portion 812 can yield the same actions and effects as those of the fixing portion 202 of the above embodiment.

The invention claimed is:

1. A production method for a stabilizer link, comprising:
a subassembly forming step in which a subassembly having a stud ball, a main body of a ball seat, and a housing is formed, wherein in the subassembly forming step, a space is formed between a bottom side of a side surface of the main body and a bottom side of an inner surface of the housing;
a cavity forming step in which a die is provided to an outer surface of a bottom side of the housing in the subassembly and a cavity is thereby formed; and
an injection molding step in which injection molding is performed such that a reinforced resin is injected into the cavity and the space, and a fixing portion of the ball seat is thereby found so as to cover the bottom side of the side surface of the main body, wherein
in formation of the main body of the ball seat, a first fit shape including at least one of a recess and a protrusion is formed at the bottom side of the side surface of the main body, and
in formation of the fixing portion of the ball seat, a resin including a reinforcing agent is used as the reinforced resin, the reinforced resin is flowed to an outer surface of the side surface of the main body through a hole of the housing, so that a second fit shape fitted to the first fit shape is formed at the fixing portion, a projection projecting from the hole of the housing to an external is formed at a bottom of the fixing portion, and the projection is formed to have a shape engaging with the outer surface of the bottom of the housing.

2. The production method for a stabilizer link according to claim 1, wherein
another hole is formed at the bottom of the housing, and
in the formation of the fixing portion of the ball seat, in injection of the reinforced resin into the cavity and the space, a gas is discharged from the another hole, another projection projecting from the another hole to an external is formed, and the another projection is formed to have a shape engaging with the outer surface of the bottom of the housing.

3. A stabilizer link comprising:
a stud ball having a ball;
a ball seat having a main body and a fixing portion, the ball is slidably fitted into the main body, the fixing portion separately formed from the main body so as to cover a bottom side of a side surface of the main body; and
a housing holding the ball seat therein and having a hole at a bottom thereof, wherein
the fixing portion is made of a reinforced resin including a reinforcing agent,
a first fit shape including at least one of a recess and a protrusion is formed at the bottom side of the side surface of the main body, and a second fit shape fitted to the first fit shape is formed at the fixing portion,
a projection projecting from the hole of the housing to an external is formed at a bottom of the fixing portion, and the projection is formed to have a shape engaging with an outer surface of the bottom of the housing,
the main body of the ball seat has a ball receiving portion and a reinforcing portion, the ball is slidably fitted into the ball receiving portion, the reinforcing portion formed at an outside of the ball receiving portion and made of a reinforced resin,
the first fit shape is formed at a bottom side of a side surface of the reinforcing portion,
the fixing portion is formed so as to cover the bottom side of the side surface of the reinforcing portion, and
the fixing portion includes a wall portion which separates an inner bottom surface of the housing and a bottom surface of the reinforcing portion, the second fit shape extends from a circumferential edge of the wall portion, and the projection projects from the wall portion.

4. The stabilizer link according to claim 3, wherein the fixing portion is formed by flowing the reinforced resin through the hole formed in the bottom of the housing thereinto, and the reinforced resin includes 10 to 30 mass % of reinforcing fiber.

5. A stabilizer link comprising:
a stud hall having a ball;
a ball seat having a main body and a fixing portion, the ball is slidably fitted into the main body, the fixing portion separately formed from the main body so as to cover a bottom side of a side surface of the main body; and
a housing holding the ball seat therein and having a hole at a bottom thereof, wherein
the fixing portion is made of a reinforced resin including a reinforcing agent,
a first fit shape including at least one of a recess and a protrusion is formed at the bottom side of the side surface of the main body, and a second fit shape fitted to the first fit shape is formed at the fixing portion,
a projection projecting from the hole of the housing to an external is formed at a bottom of the fixing portion, and the projection is formed to have a shape engaging with an outer surface of the bottom of the housing,
the main body of the ball seat has a ball receiving portion and a reinforcing portion, the ball is slidably fitted into the ball receiving portion, the reinforcing portion formed at an outside of the ball receiving portion and made of a reinforced resin,
the first fit shape is formed at a bottom side of a side surface of the reinforcing portion,
the fixing portion is formed so as to cover the bottom side of the side surface of the reinforcing portion, and
the ball receiving portion of the main body is made of an unreinforced resin.

6. The stabilizer link according to claim 5, wherein the fixing portion is formed by flowing the reinforced resin through the hole formed in the bottom of the housing thereinto, and the resin includes 10 to 30 mass % of reinforcing fiber.

* * * * *